(12) United States Patent
Iwata et al.

(10) Patent No.: US 12,325,792 B2
(45) Date of Patent: Jun. 10, 2025

(54) FLAME RETARDANT RESIN COMPOSITION, INSULATED WIRE USING THE SAME, CABLE AND OPTICAL FIBER CABLE

(71) Applicant: Fujikura Ltd., Tokyo (JP)

(72) Inventors: Masayuki Iwata, Chiba (JP); Yusuke Yamaki, Chiba (JP); Shoichiro Nakamura, Chiba (JP)

(73) Assignee: Fujikura Ltd., Tokyo (JP)

( * ) Notice: Subject to any disclaimer, the term of this patent is extended or adjusted under 35 U.S.C. 154(b) by 579 days.

(21) Appl. No.: 16/961,584

(22) PCT Filed: Mar. 14, 2019

(86) PCT No.: PCT/JP2019/010636
§ 371 (c)(1),
(2) Date: Jul. 10, 2020

(87) PCT Pub. No.: WO2019/181745
PCT Pub. Date: Sep. 26, 2019

(65) Prior Publication Data
US 2021/0061985 A1    Mar. 4, 2021

(30) Foreign Application Priority Data

Mar. 22, 2018 (JP) ................................ 2018-053795

(51) Int. Cl.
*C08L 23/06* (2006.01)
*C08K 3/016* (2018.01)
(Continued)

(52) U.S. Cl.
CPC .............. *C08L 53/00* (2013.01); *C08L 23/06* (2013.01); *C08L 23/12* (2013.01); *C08L 23/14* (2013.01);
(Continued)

(58) Field of Classification Search
CPC ...... C08L 2201/02; C08L 23/06; C08L 23/12; C08L 23/14; C08K 3/016
See application file for complete search history.

(56) References Cited

U.S. PATENT DOCUMENTS

| | | | |
|---|---|---|---|
| 6,448,499 B1 * | 9/2002 | O'Brien | H01B 3/441 |
| | | | 174/120 SR |
| 2015/0318076 A1 * | 11/2015 | Iwata | H01B 3/44 |
| | | | 524/400 |

(Continued)

FOREIGN PATENT DOCUMENTS

| | | |
|---|---|---|
| CN | 103524820 A | 1/2014 |
| CN | 107266815 A | 10/2017 |

(Continued)

OTHER PUBLICATIONS

Machine translation of JP2002324441A obtained from Espacenet (Year: 2002).*

(Continued)

*Primary Examiner* — Kregg T Brooks
*Assistant Examiner* — David R. Foss
(74) *Attorney, Agent, or Firm* — Osha Bergman Watanabe & Burton LLP

(57) ABSTRACT

Provided is a flame retardant resin composition that includes a base resin, a filler blended in a ratio of 5 parts by mass or more relative to 100 parts by mass of the base resin, a silicone compound blended in a ratio of 0.5 part by mass or more relative to 100 parts by mass of the base resin, and a fatty acid-containing compound blended in a ratio of 3 parts by mass or more relative to 100 parts by mass of the base resin. The filler may have a silane coupling agent having a polar group adhered to at least a part of a surface of a silicate (Continued)

compound. Further provided are an insulated wire, a cable, and an optical fiber cable that includes in part the flame retardant resin composition.

10 Claims, 3 Drawing Sheets

(51) Int. Cl.
    *C08L 23/12*     (2006.01)
    *C08L 23/14*     (2006.01)
    *C08L 53/00*     (2006.01)
    *G02B 6/44*     (2006.01)
    *H01B 3/44*     (2006.01)
    *H01B 7/295*     (2006.01)

(52) U.S. Cl.
    CPC ............. *G02B 6/443* (2013.01); *H01B 3/441* (2013.01); *H01B 7/295* (2013.01); *C08K 3/016* (2018.01); *C08L 2201/02* (2013.01); *C08L 2203/202* (2013.01); *C08L 2205/025* (2013.01); *C08L 2205/03* (2013.01); *C08L 2205/035* (2013.01)

(56) References Cited

U.S. PATENT DOCUMENTS

| | | |
|---|---|---|
| 2017/0051208 A1 | 2/2017 | Iwata et al. |
| 2018/0346702 A1 | 12/2018 | Nishiguchi et al. |

FOREIGN PATENT DOCUMENTS

| | | | |
|---|---|---|---|
| EP | 3375815 A1 | | 9/2018 |
| EP | 3375816 A1 | | 9/2018 |
| JP | H01137518 A | | 5/1989 |
| JP | H10204298 A | | 8/1998 |
| JP | 2001184946 A | | 7/2001 |
| JP | 2002324441 A | * | 11/2002 |
| JP | 2004075811 A | | 3/2004 |
| JP | 2004094969 A | | 3/2004 |
| JP | 2013014714 A | | 1/2013 |
| JP | 2014094969 A | | 5/2014 |
| JP | 2017141383 A | | 8/2017 |
| JP | 2017179044 A | | 10/2017 |
| WO | 2017104361 A1 | | 6/2017 |
| WO | 2017104362 A1 | | 6/2017 |

OTHER PUBLICATIONS

International Preliminary Report on Patentability issued in corresponding International Application No. PCT/JP2019/010636 mailed Oct. 1, 2020 (18 pages).
Office Action issued in corresponding Chinese Patent Application No. 201980009192.3 mailed Oct. 14, 2021 (10 pages).
Extended European Search Report issued in corresponding European Patent Application No. 19772598.9 issued on Aug. 18, 2021 (7 pages).
Database WPI, Week 201430, Thomson Scientific, London, GB; AN 2014-E93187, XP002803874, -& CN 103 524 820 A, published on Jan. 22, 2014 (10 pages).
Database WPI, Week 201783, Thomson Scientific, London, GB; AN 2017-72614U, XP002803875, -& CN 107 266 815 A, published on Oct. 20, 2017 (14 pages).

* cited by examiner

FLAME RETARDANT RESIN COMPOSITION, INSULATED WIRE USING THE SAME, CABLE AND OPTICAL FIBER CABLE

TECHNICAL FIELD

One or more embodiments of the present invention relate to a flame retardant resin composition, an insulated wire using the same, and a cable and an optical fiber cable.

BACKGROUND

So-called eco-materials are widely used for covering of cables, outer sheaths of cables, tubes, tapes, packaging materials, building materials and the like.

As such an ecomaterial, for example, a flame retardant resin composition in which calcium carbonate particles, a silicone compound and a fatty acid-containing compound are blended to a polyolefin resin is known (See Patent Document 1 below).

PATENT DOCUMENT

Patent Document 1: JP 2004-94969 A

In recent years, suppression of plastic deformation as well as flame retardancy may be required for a flame retardant resin composition in order to be applicable to a variety of applications including cables. In particular, this requirement may become stronger in automotive cables.

However, the flame retardant resin composition described in the above-mentioned Patent Document 1 contains a silicone compound or a fatty acid-containing compound, and has flame retardancy.

For this reason, a flame retardant resin composition capable of suppressing plastic deformation while having good flame retardancy has been required.

SUMMARY

One or more embodiments of the present invention provide a flame retardant resin composition capable of suppressing plastic deformation while having good flame retardancy, an insulated wire using the same, a cable and an optical fiber cable.

The present inventors have found that one or more of the above-mentioned embodiments can be provided by blending a filler where a silane coupling agent having a polar group is adhered to at least a part of a surface of a silicate compound, a silicone compound and a fatty acid-containing compound at predetermined ratios relative to 100 parts by mass of the base resin.

That is, one or more embodiments of the present invention provide a flame retardant resin composition comprising a base resin, a filler blended in a ratio of 5 parts by mass or more relative to 100 parts by mass of the base resin, a silicone compound blended in a ratio of 0.5 part by mass or more relative to 100 parts by mass of the base resin and a fatty acid-containing compound blended in a ratio of 3 parts by mass or more relative to 100 parts by mass of the base resin, in which the filler is a filler where a silane coupling agent having a polar group is adhered to at least a part of the surface of a silicate compound.

According to the flame retardant resin composition of one or more embodiments of the present invention, it can suppress plastic deformation while having a good flame retardancy.

Incidentally, the present inventors presume the reason why the above-mentioned effect can be obtained in the flame retardant resin composition of one or more embodiments of the present invention as follows:

That is, when a filler containing a silicate compound, a silicone compound and a fatty acid-containing compound are included in the flame retardant resin composition, a barrier layer mainly composed of the silicate compound, the silicone compound, the fatty acid-containing compound and their decomposed products is formed at the time of combustion of the flame retardant resin composition, and combustion of the base resin is suppressed. Therefore, it is considered that good flame retardancy can be secured. Further, since the filler is a filler in which a silane coupling agent containing a polar group is adhered to at least a part of the surface of the silicate compound, the silane coupling agent of the filler is likely to interact with the silicone compound and the fatty acid-containing compound by blending the filler in the flame retardant resin composition. Therefore, it is considered that plastic deformation can be suppressed even an external stress is applied to the flame retardant resin composition.

In the above-mentioned flame retardant resin composition, it is preferable that the polar group contain at least one of a nitrogen atom, a sulfur atom and an oxygen atom.

In this case, since the silane coupling agent of the filler is more likely to interact with the silicone compound and the fatty acid-containing compound, plastic deformation of the flame retardant resin composition can be more sufficiently suppressed. Further, wear resistance of the flame retardant resin composition can also be improved.

In the above-mentioned flame retardant resin composition, it is preferable that the polar group contain at least one of a nitrogen atom and a sulfur atom.

In this case, since the silane coupling agent of the filler is even more likely to interact with the silicone compound or the fatty acid-containing compound, plastic deformation of the flame retardant resin composition can be more sufficiently suppressed. Further, the wear resistance of the flame retardant resin composition can also be further improved.

In the above-mentioned flame retardant resin composition, it is preferable that the polar group include an amino group.

In this case, as compared with the case where the polar group is a polar group having a nitrogen atom, other than the amino group, plastic deformation of the flame retardant resin composition can be suppressed more effectively, and the wear resistance of the flame retardant resin composition can also be improved more effectively.

In the above-mentioned flame retardant resin composition, it is preferable that the polar group include a mercapto group.

In this case, as compared with the case where the polar group is a polar group having a sulfur atom, other than a mercapto group, the plastic deformation of the flame retardant resin composition can be suppressed more effectively, and the wear resistance of the flame retardant resin composition can be improved more effectively.

In the above-mentioned flame retardant resin composition, the base resin preferably contains a polar group-free polyolefin resin containing no polar group.

In this case, as compared with the case where the base resin does not contain a polar group-free polyolefin resin, the wear resistance of the flame retardant resin composition can be more sufficiently improved.

In the above-mentioned flame retardant resin composition, the base resin preferably contains a polar group-containing resin containing a polar group.

In this case, as compared with the case that the base resin does not contain a polar group-containing resin, plastic deformation of the flame retardant resin composition can be suppressed more effectively, and the wear resistance of the flame retardant resin composition can also be improved more effectively.

In the above-mentioned flame retardant resin composition, the polar group-containing resin is preferably composed of a polar group-containing polyolefin resin containing a polar group.

In this case, as compared with the case where the polar group-containing resin is composed of a polar group-containing resin other than the polar group-containing polyolefin resin, the plastic deformation of the flame retardant resin composition can be particularly effectively suppressed and the wear resistance of the resin composition can also be more sufficiently improved.

In the above-mentioned flame retardant resin composition, the silicate compound is preferably calcined clay.

In this case, since the calcined clay has less moisture content than non-calcined clay, moisture in the filler is reduced as compared with the case where the clay is non-calcined clay. Therefore, it is possible to reduce the bubbles in a molded body obtained by molding the flame retardant resin composition and it is possible to improve the appearance of the molded body.

In the above-mentioned flame retardant resin composition, the filler is preferably blended in a ratio of less than 150 parts by mass relative to 100 parts by mass of the base resin.

In this case, as compared with the case where the blending ratio of the filler relative to 100 parts by mass of the base resin is 150 parts by mass or more, weight reduction can be achieved more.

Moreover, one or more embodiments of the present invention include an insulated wire including a conductor and an insulating layer covering the conductor, in which the insulating layer is composed of the flame retardant resin composition described above.

According to the insulated wire of one or more embodiments of the present invention, since the insulating layer is composed of the flame retardant resin composition as described above, it can improve terminal workability while having good flame retardancy.

Further, one or more embodiments of the present invention provide a cable including an insulated wire including a conductor and an insulating layer covering the conductor and a sheath covering the insulated wire, in which at least one of the insulating layer and the sheath is composed of the above-mentioned flame retardant resin composition.

According to the cable of one or more embodiments of the present invention, at least one of the insulating layer and the sheath is composed of the above-mentioned flame retardant resin composition, it can improve the terminal workability while having good flame retardancy.

Further, one or more embodiments of the present invention provide an optical fiber cable including an optical fiber and a covering portion covering the optical fiber, in which at least a part of the covering portion is composed of the flame retardant resin composition described above.

According to the optical fiber cable of one or more embodiments of the present invention, since at least a part of the covering portion is composed of the above-mentioned flame retardant resin composition, it can improve the terminal workability while having good flame retardancy.

According to one or more embodiments of the present invention, a flame retardant resin composition capable of suppressing plastic deformation while having a good flame retardancy, an insulated wire using the same, a cable and an optical fiber cable are provided.

DETAILED DESCRIPTION

Hereinafter, embodiments of the present invention will be described in detail with reference to FIGS. 1 and 2.

[Cable]

Figure 1:
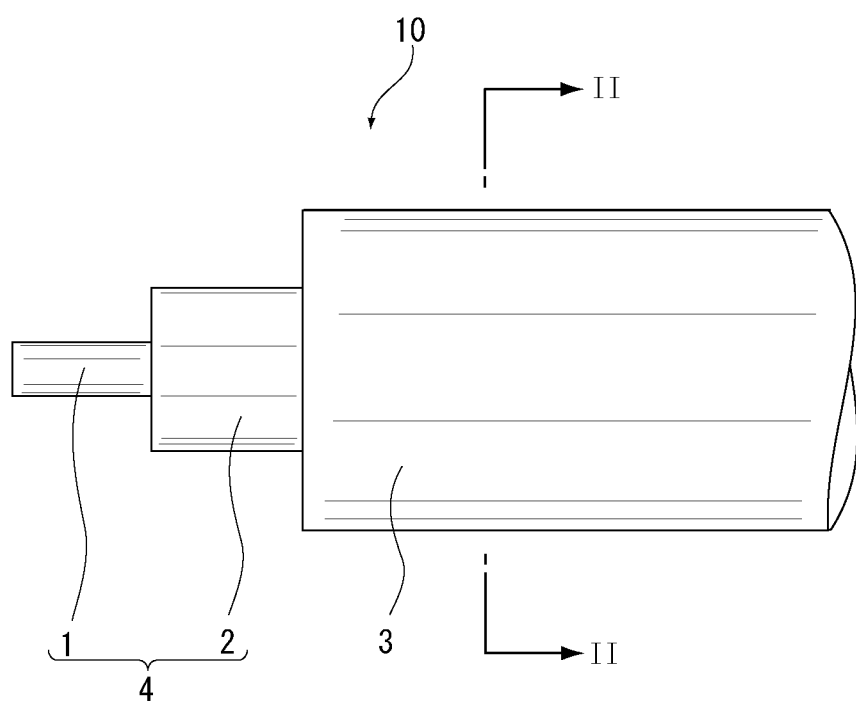
FIG. 1 is a partial side view illustrating a cable according to one or more embodiments of the present invention.
Figure 2:
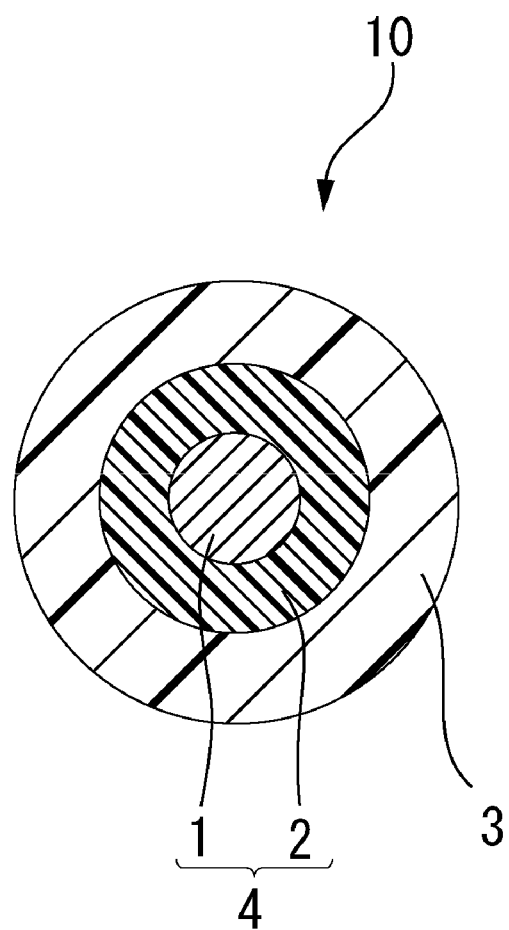
FIG. 2 is a cross-sectional view taken along line II-II of FIG. 1.

FIG. 1 is a partial side view illustrating a cable according to one or more embodiments of the present invention. FIG. 2 is a cross-sectional view taken along line II-II of FIG. 1. As illustrated in FIGS. 1 and 2, a cable 10 includes an insulated wire 4 and a tubular coating layer 3 coating the insulated wire 4. The insulated wire 4 includes a conductor 1 and a tubular insulating layer 2 covering the conductor 1.

Here, the tubular insulating layer 2 and the coating layer 3 are composed of a flame retardant resin composition, and this flame retardant resin composition includes a base resin, a filler, a silicone compound, and a fatty acid-containing compound. Here, the filler is a filler where a silane coupling agent having a polar group is adhered to at least a part of a surface of a silicate compound. The filler is blended in a ratio of 5 parts by mass or more relative to 100 parts by mass of the base resin, the silicone compound is blended in a ratio of 0.5 part by mass or more relative to 100 parts by mass of the base resin, and the fatty acid-containing compound is blended in a ratio of 3 parts by mass or more relative to 100 parts by mass of the base resin.

The insulating layer 2 and the coating layer 3 composed of the above-mentioned flame retardant resin composition can suppress plastic deformation while having good flame retardancy. Accordingly, the cable 10 can improve the terminal workability while having a good flame retardancy.

[Method of Manufacturing Cable]

Next, a method of manufacturing the cable 10 described above will be described.

<Conductor>

First, a conductor 1 is prepared. The conductor 1 may be formed of only one strand or may be constituted by bundling a plurality of strands. The conductor 1 is not particularly limited on a conductor diameter or material of the conductor and can be determined depending on the intended use. As the material of the conductor 1, for example, primarily copper, aluminum or an alloy containing them is preferable. However, conductive materials such as carbon materials can also be appropriately used.

<Flame Retardant Resin Composition>

On the other hand, the above-mentioned flame retardant resin composition is prepared. As described above, the flame retardant resin composition includes a base resin, a filler, a silicone compound and a fatty acid-containing compound.

(1) Base Resin
(A) Polar Group-Free Resin

The based resin is not particularly limited. Examples of the base resin include a polar group-free resin such as a polar group-free polyolefin resin containing no polar group and a polar group-free non-polyolefin resin such as a styrene resin which contains no polar group and is not a polyolefin resin. These may be used alone or in combination of two or more.

(A1) Polar Group-Free Polyolefin Resin

Among the polar group-free resins, the base resin is preferably a polar group-free polyolefin resin. In this case, as compared with the case where the base resin does not contain a polar group-free polyolefin resin, wear resistance of the flame retardant resin composition can be more sufficiently improved. Incidentally, both a polar group-free polyolefin resin and a polar group-free non-polyolefin resin are composed of only carbon atoms and hydrogen atoms. Examples of the polar group-free polyolefin resin include polyethylene, polypropylene and an ethylene-α-olefin copolymer such as an ethylene-propylene copolymer.

Polypropylene refers to a resin containing a structural unit derived from propylene. Therefore, such a polypropylene includes homopolypropylene obtained by homopolymerization of propylene, polypropylene copolymer which is a copolymer of an olefin than propylene and propylene, and a mixture of two or more of these. Examples of the olefin other than propylene include ethylene, 1-butene, 2-butene, 1-hexene and 2-hexene. Among these, α-olefin such as ethylene, 1-butene or 1-hexene is preferably used from the viewpoint of excellent mechanical properties, and ethylene is more preferably used.

In a case where the polypropylene is a polypropylene copolymer, this polypropylene copolymer may be a block polypropylene copolymer or a random polypropylene copolymer, but is preferably a block polypropylene copolymer. When the polypropylene copolymer is a block polypropylene copolymer, as compared with the case where the polypropylene copolymer is a random polypropylene copolymer, the plastic deformation suppressibility and wear resistance of the flame retardant resin composition can be further improved.

The polyethylene may be a linear polyethylene, a branched polyethylene or a mixture thereof. However, since the molding is facilitated, a linear polyethylene is preferable as the polyethylene.

Incidentally, in a case where the base resin contains a polar group-free polyolefin resin, it is preferable that the content of the polypropylene in the polar group-free polyolefin resin be from 70 to 100 mass % and the content of polyethylene in the polar group-free polyolefin resin be from 0 to 30 mass %.

In this case, the wear resistance of the flame retardant resin composition can be more sufficiently improved.

(A2) Polar Group-Free Non-Polyolefin Resin

Examples of the polar group-free non-polyolefin resin include a styrene resin which contains no polar group and is not a polyolefin resin. Examples of the styrene resin include a hydrogenated styrene-butadiene rubber (HSBR), a styrene-ethylene-propylene copolymer (SEP), a styrene-ethylene-propylene-styrene block copolymer (SEPS), a styrene-ethylene-ethylene-propylene-styrene copolymer (SEEPS) and a styrene-ethylene-butadiene-styrene copolymer (SEBS).

(B) Polar Group-Containing Resin

The based resin may or may not include a polar group-containing resin containing a polar group together with the above-mentioned polar group-free polyolefin resin or in place of the polar group-free polyolefin resin, but preferably include a polar group-containing resin. In this case, as compared with the case where the base resin does not contain a polar group-containing resin, the wear resistance of the flame retardant resin composition can be more effectively improved and the plastic deformation can be more sufficiently suppressed.

Examples of the polar group-containing resin include a resin where a polar group is introduced by grafting or copolymerization in the polar group-free resin described above and a precursor thereof. The polar group refers to a functional group having atoms other than carbon atoms and hydrogen atoms. Examples of the polar group include a polar group containing at least one of a nitrogen atom, an oxygen atom, a sulfur atom and a chlorine atom. The polar group preferably contains an oxygen atom.

Examples of the polar group having an oxygen atom include a carboxyl group, an acid anhydride group, a methacryloxy group, an acryloxy group, an acrylic group, an acetyl group and an alkoxy group (a methoxy group or an ethoxy group, for example). Among them, a carboxyl group or an acid anhydride group is preferable. In this case, as compared with the case where the polar group is a polar group having an oxygen atom, other than the carboxyl group and the acid anhydride group, the plastic deformation of the flame retardant resin composition can be suppressed more effectively and the wear resistance of the flame retardant resin composition can also be improved more effectively.

Examples of a substance forming a polar group having an oxygen atom include an acid, an acid anhydride, derivatives thereof, and a silane coupling agent. Examples of the acid include a carboxylic acid such as an acetic acid, an acrylic acid, a maleic acid and a methacrylic acid. Examples of the acid anhydride include a carboxylic acid anhydride such as maleic anhydride. The silane coupling agent is represented by $X^1$—Si—$Y^1{}_3$. Here, X' represents a group which reacts and bonds with the polar group-free resin and the precursor thereof, and $Y^1$ becomes a polar group having an oxygen atom in the polar group containing resin. As the silane coupling agent, a silane coupling agent containing a C—C double bond which likely causes a graft reaction as $X^1$ is preferable, and a silane coupling agent containing a methacryloxy group, an acryloxy group, a styryl group or a vinyl group is particularly preferable as $X^1$.

(B1) Polar Group-Containing Polyolefin Resin

The polar group-containing resin may be composed of a polyolefin resin containing a polar group (hereinafter, referred to as "polar group-containing polyolefin resin") or may be a resin other than a polyolefin resin containing a polar group (hereinafter, referred to as "polar group-containing non-polyolefin resin"), but is preferably composed of a polar group-containing polyolefin resin. In this case, as compared with the case where the polar group-containing resin is composed of a polar group-containing resin other than the polar group containing polyolefin resin, the plastic deformation of the flame retardant resin composition can be suppressed particularly effectively and the wear resistance of the flame retardant resin composition can also be improved more effectively. Therefore, the terminal workability and wear resistance of the cable 10 can be further improved.

Examples of the polar group-containing polyolefin resin include carboxylic acid anhydride-modified polyolefins such as a maleic acid anhydride-modified polyethylene, a maleic acid anhydride-modified polypropylene; maleic acid-modified polyolefins such as a maleic acid-modified polyethylene, maleic acid-modified polypropylene; an ethylene-ethyl acrylate copolymer (EEA), an ethylene-vinyl acetate copolymer (EVA); and vinyl silane grafted polyethylene. Among them, as the polar group-containing polyolefin resin, a maleic acid-modified polyolefin is preferable. In this case, plastic deformation of the flame retardant resin composition can be more sufficiently suppressed.

Incidentally, in the above-mentioned flame retardant resin composition, in the case where the base resin contains a polar group-free polyolefin resin as well as the polar group-containing polyolefin resin, the content of the polar group-free polyolefin resin in the base resin and the content of the polar group-containing polyolefin resin in the base resin are not particularly limited, respectively, but it is preferable that the content of the polar group-free polyolefin resin in the base resin be from 80 to 95 mass % and the content of the polar group-containing polyolefin resin in the base resin be 5 to 20 mass %.

In this case, the plastic deformation of the flame retardant resin composition can be more sufficiently suppressed. Further, the wear resistance of the flame retardant resin composition can also be more sufficiently improved.

(B2) Polar Group-Containing Non-Polyolefin Resin

Examples of the polar group-containing non-polyolefin resin include an acid-modified styrenic elastomer.

(2) Filler

The filler is a filler obtained by attaching a silane coupling agent having a polar group to at least a part of a surface of a silicate compound. Here, examples of the "filler obtained by attaching a silane coupling agent having a polar group to at least a part of a surface of a silicate compound" include a filler obtained by physically adsorbing a silane coupling agent just on at least a part of the surface of the silicate compound; and a filler obtained by chemically bonding a surface active group of a silicate compound (for example, a hydroxyl group) with a silane coupling agent by hydrolysis and dehydration condensation.

Examples of the silicate compound include clay and talc. These may be used alone or in combination of two or more.

The clay may be non-calcined clay or calcined clay, but is preferably calcined clay. The calcined clay includes less water content than the non-calcined clay. Therefore, as compared with the case the clay is non-calcined clay, moisture in the filler is reduced. Therefore, it is possible to reduce the bubbles in the insulating layer 2 and the coating layer 3 obtained by molding the flame retardant resin composition and to improve the appearance of the cable 10. Further, it brings small influence on the barrier layer due to evaporation of water and can enhance the flame retardancy. The calcined clay refers to clay obtained by dehydrating crystal water present between layers of non-calcined clay by calcining the non-calcined clay and destroying a regular layer structure.

The silane coupling agent having a polar group is represented by $X^2$—Si—$Y^2{}_3$. Here, the polar group in the silane coupling agent is contained in the $X^2$. $Y^2$ is a group adhered to at least a part of the surface of the silicate compound, and $Y^2$ represents an alkoxy group or an alkyl group (for example, a methyl group) and includes at least one alkoxy group. The polar group refers to a functional group having atoms other than carbon atoms and hydrogen atoms. Examples of the polar group include a polar group having at least one of a nitrogen atom, an oxygen atom, a sulfur atom and a chlorine atom. Among them, the polar group preferably includes at least one of a nitrogen atom, an oxygen atom and a sulfur atom. In this case, since the silane coupling agent of the filler is likely to interact with the silicone compound and the fatty acid-containing compound, the plastic deformation of the flame retardant resin composition can be more sufficiently suppressed. Further, the wear resistance of the flame retardant resin composition can also be improved. Further, the polar group preferably includes at least one of a nitrogen atom and a sulfur atom. In this case, since the silane coupling agent of the filler is likely to interact with the silicone compound and the fatty acid-containing compound, the plastic deformation of the flame retardant resin composition can be more sufficiently suppressed. Further, the wear resistance of the flame retardant resin composition can also be improved.

Examples of the polar group having a nitrogen atom include an amino group, an amide group, a nitro group and a nitrile group. Among them, the amino group is preferable. In this case, as compared with the case where the polar group is a polar group having a nitrogen atom, other than the amino group, the plastic deformation of the flame retardant resin composition can be suppressed more effectively and the wear resistance of the flame retardant resin composition can also be improved more effectively.

Examples of the polar group having a sulfur atom include a mercapto group and a sulfide group. Among them, the mercapto group is preferable. In this case, as compared with the case where the polar group is a polar group having a sulfur atom, other than the mercapto group, the plastic deformation of the flame retardant resin composition can be suppressed more effectively and the wear resistance of the flame retardant resin composition can also be improved more effectively.

The silane coupling agent may be adhered to the whole surface of the silicate compound or may be adhered only to a part of the surface of the silicate compound.

In the filler, the blending ratio of the silane coupling agent relative to 100 parts by mass of the silicate compound is not particularly limited but is preferably 0.1 to 5 parts by mass. However, the blending ratio of the silane coupling agent relative to 100 parts by mass of the silicate compound is more preferably 0.5 to 2 parts by mass. In this case, the plastic deformation suppressibility and wear resistance of the flame retardant resin composition can be further improved.

The filler is blended in a ratio of 5 parts by mass or more relative to 100 parts by mass of the base resin. In this case, as compared with the case where the blending ratio of the filler relative to 100 parts by mass of the base resin is less than 5 parts by mass, the plastic deformation suppressibility of the flame retardant resin composition can be further improved.

The blending ratio of the filler relative to 100 parts by mass of the base resin is preferably 15 parts by mass or more. In this case, as compared with the case where the blending ratio of the filler relative to 100 parts by mass of the base resin is less than 15 parts by mass, more excellent flame retardancy is obtained in the flame retardant resin composition. The blending ratio of the filler relative to 100 parts by mass of the base resin is more preferably 30 parts by mass or more, and is particularly preferably 45 parts by mass or more.

The blending ratio of the filler relative to 100 parts by mass of the base resin is less than 150 parts by mass. In this case, as compared with the case where the blending ratio of the filler relative to 100 parts by mass of the base resin is 150 parts by mass or more, weight reduction can be achieved more.

Further, the blending ratio of the filler relative to 100 parts by mass of the base resin is 120 parts by mass or less. In this case, as compared with the case where the blending ratio of the filler relative to 100 parts by mass of the base resin exceeds 120 parts by mass, the flame retardant resin composition can achieve weight reduction more and has more excellent mechanical properties. The blending ratio of the filler relative to 100 parts by mass of the base resin is preferably 100 parts by mass or less, is more preferably 80 parts by mass or less and even more preferably 60 parts by mass or less, from the viewpoint of weight reduction.

(3) Silicone Compound

The silicone compound functions as a flame retardant. Examples of the silicone compound include polyorganosiloxanes. Here, polyorganosiloxanes include organic groups in side chains with a siloxane bond used in the main chain. Examples of the organic group include an alkyl group such as a methyl group, an ethyl group, a propyl group; a vinyl group; and an aryl group such as a phenyl group. Specifically, examples of the polyorganosiloxanes include, for example, dimethylpolysiloxane, methylethylpolysiloxane, methyloctylpolysiloxane, methylvinylpolysiloxane, methylphenylpolysiloxane and methyl(3,3,3-trifluoropropyl) polysiloxane. Polyorganosiloxanes are used in the form of a silicone oil, a silicone powder, a silicone gum or a silicone resin. Among them, the polyorganosiloxane is preferably used in the form of the silicone gum. In this case, as compared with the case where the silicone compound is a silicone compound other than the silicone gum, blooming hardly occurs in the flame retardant resin composition.

The silicone compound is blended in a ratio of 0.5 parts by mass or more relative to 100 parts by mass of the base resin as described above. In this case, as compared with the case where the blending ratio of the silicone compound relative to 100 parts by mass of the base resin is less than 0.5 parts by mass, the flame retardancy of the flame retardant resin composition can be further improved.

The blending ratio of the silicone compound relative to 100 parts by mass of the base resin is 1 part by mass or more. In this case, as compared with the case where the blending ratio of the silicone compound relative to 100 parts by mass of the base resin is less than 1 part by mass, more excellent flame retardancy is obtained in the flame retardant resin composition.

The blending ratio of the silicone compound relative to 100 parts by mass of the base resin is 10 parts by mass or less. In this case, as compared with the case where the blending ratio of the silicone compound relative to 100 parts by mass of the base resin is more than 10 parts by mass, the wear resistance of the flame retardant resin composition can be further improved. The blending ratio of the silicone compound relative to 100 parts by mass of the base resin is 7.5 parts by mass or less. In this case, as compared with the case where the blending ratio of the silicone compound relative to 100 parts by mass of the base resin is more than 7.5 parts by mass, the wear resistance and plastic deformation suppressibility can be further improved. The blending ratio of the silicone compound relative to 100 parts by mass of the base resin is 5 parts by mass or less.

(4) Fatty Acid-Containing Compound

The fatty acid-containing compound functions as a flame retardant. The fatty acid-containing compound refers to a compound containing a fatty acid or a metal salt thereof. Here, as the fatty acid, for example, a fatty acid having from 12 to 18 carbon atoms is used. Examples of the fatty acid include lauric acid, myristic acid, palmitic acid, stearic acid, tuberculostearic acid, oleic acid, linoleic acid, arachidonic acid, behenic acid and montanic acid. Among them, as the fatty acid, stearic acid or tuberculostearic acid is preferable, and stearic acid is particularly preferable. In this case, as compared with the case of using a fatty acid other than stearic acid or tuberculostearic acid, more excellent flame retardancy is obtained.

The fatty acid-containing compound is preferably a fatty acid metal salt. In this case, as compared with the case where the fatty acid-containing compound is a fatty acid, more excellent flame retardancy is obtained in the flame retardant resin composition. Examples of metal constituting the fatty acid metal salt include magnesium, calcium, zinc and lead. As the fatty acid metal salt, magnesium stearate is preferable. In this case, as compared with the case of using a fatty acid metal salt other than magnesium stearate, more excellent flame retardancy is obtained with a smaller added amount in the flame retardant resin composition.

The fatty acid-containing compound is blended in a ratio of 3 parts by mass ore more relative to 100 parts by mass of the base resin as described above. In this case, as compared with the case where the ratio of the fatty acid-containing compound relative to 100 parts by mass is less than 3 parts by mass, the flame retardancy of the flame retardant resin composition can be further improved.

The blending ratio of the fatty acid-containing compound relative to 100 parts by mass of the base resin is preferable 20 parts by mass or less. In this case, as compared with the case where the blending ratio of the fatty acid-containing compound relative to 100 parts by mass is more than 20 parts by mass, the wear resistance of the flame retardant resin composition can be further improved.

The blending ratio of the fatty acid-containing compound relative to 100 parts by mass of the base resin is preferably 10 parts by mass or less, and more preferably 7 parts by mass or less. In this case, as compared with the case where the blending ratio of the fatty acid-containing compound relative to 100 parts by mass is more than 10 parts by mass, more excellent wear resistance is obtained in the flame retardant resin composition.

The above-mentioned flame retardant resin composition may further include a filler such as an antioxidant, an ultraviolet deterioration preventing agent, a processing aid, a color pigment and a lubricant if necessary.

The above-mentioned flame retardant resin composition can be obtained by kneading the base resin, the filler, the silicone compound and the fatty acid-containing compound. Kneading can be carried out with a kneading machine such as a Banbury mixer, a tumbler, a pressure kneader, a kneading extruder, a twin-screw extruder, a mixing roll, for example. At this time, from the viewpoint of improving the dispersibility of the silicone compound, it is allowed that a part of the base resin and the silicone compound are kneaded and the obtained master batch (MB) is kneaded with the remaining base resin, the fatty acid-containing compound and the filler.

Next, the conductor 1 is coated with the above-mentioned flame retardant resin composition. Specifically, the above-mentioned flame retardant resin composition is melt-kneaded using an extruder to form a tubular extrudate. Then, the conductor 1 is continuously coated with this tubular extrudate. Thus, the insulating layer 2 is formed on the conductor 1 and then the insulated wire 4 is obtained.

<Coating Layer>

Finally, one insulated wire 4 obtained as described above is prepared, and this insulated wire 4 is coated with the coating layer 3 as an insulating body prepared by using the flame retardant resin composition described above. The coating layer 3 is a so-called sheath and protects the insulation layer 2 from physical or chemical damage.

In the way described above, the cable 10 is obtained.

The present invention is not limited to the above-mentioned embodiments. For example, in one or more of the above-mentioned embodiments, a cable having a single insulated wire 4 is used as a cable, but the cable of one or more embodiments of the present invention is not limited to a cable having a single insulated wire 4 and may be a cable having two or more insulated wire 4 inside the coated layer 3. A resin portion composed of polypropylene or the like may be provided between the coated layer 3 and the insulated wire 4.

Further, in one or more of the above-mentioned embodiments, the insulating layer 2 and the coating layer 3 of the insulated wire 4 are composed of the above-mentioned flame retardant resin composition, but it is allowed that the insulating layer 2 is composed of a typical insulating resin without composing of the above-mentioned flame retardant resin composition and only the coating layer 3 is composed of the above-mentioned flame retardant resin composition, or it is also allowed that the coating layer 3 is composed of a typical insulating resin without composing of the above-mentioned flame retardant resin composition and only the insulating layer 2 is composed of the above-mentioned flame retardant resin composition. Further, the coating layer 3 is not always required and it can be omitted.

Figure 3:
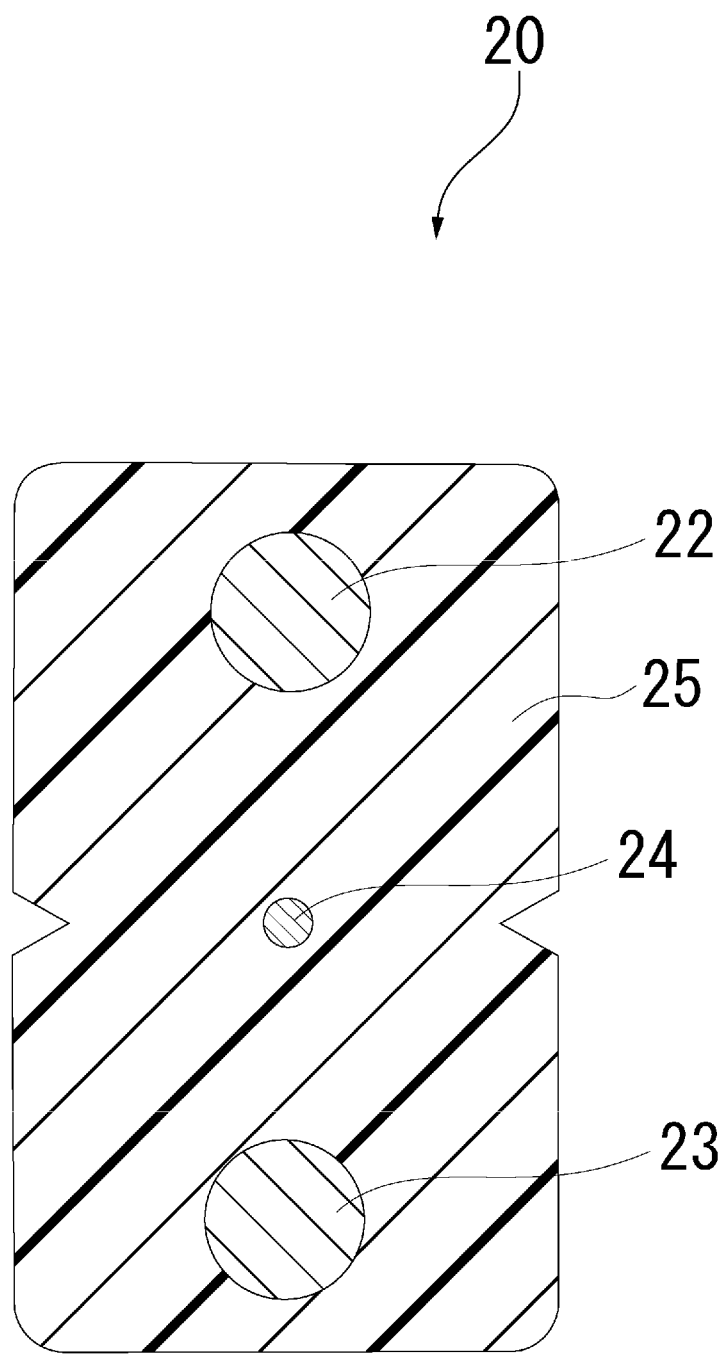
FIG. 3 is a cross-sectional view illustrating an optical fiber cable according to one or more embodiments of the present invention.

Further, the flame retardant resin composition constituting the insulating layer 2 and the coating layer 3 of the insulated wire 4 in one or more of the above embodiments is also applicable as a covering portion of an optical fiber cable including an optical fiber and the covering portion covering the optical fiber. For example, FIG. 3 is a cross-sectional view illustrating an indoor type optical fiber cable as one or more embodiments of an optical fiber cable of one or more embodiments of the present invention. As illustrated in FIG. 3, an optical fiber cable 20 includes two tension members 22 and 23, an optical fiber 24, and a covering portion 25 covering these. Here, the optical fiber 24 is provided so as to penetrate the covering portion 25. The covering portion 25 is composed of a flame retardant resin composition constituting the insulating layer 2 and the coating layer 3 of the insulated wire 4 in one or more of the above-mentioned embodiments.

Incidentally, in the optical fiber cable 20, the whole covering portion 25 is composed of the flame retardant resin composition constituting the insulating layer 2 and the coating layer 3 of the insulated wire 4, but only a part of the covering portion 25 may be constituted by the flame retardant resin composition constituting the insulating layer 2 and the coating layer 3 of the insulated wire 4.

EXAMPLES

Hereinafter, the content of one or more embodiments of the present invention will be described more specifically with reference to Examples and Comparative Examples.

Examples 1-42 and Comparative Examples 1-13

A base resin, a softening agent, a silicone masterbatch (silicone MB), a fatty acid-containing compound and a filler were blended in blending amounts shown in Tables 1 to 7 and were kneaded for 15 minutes at 160° C. by a Banbury mixer to obtain a flame retardant resin composition. Here, the silicone MB is a mixture of polyethylene or polypropylene and a silicone gum. Incidentally, in Tables 1 to 7, the unit of the blending amount of each blending component is parts by mass. Further, in Tables 1 to 7, the total of the blending amounts of the base resin is not 100 parts by mass. However, the base resin is composed of a mixture of a base resin in the column of "base resin" and polyethylene or polypropylene in the silicone MB. The total of the total blending amounts of the base resin in the column of "base resin" and the blending amount of polyethylene or polypropylene in the silicone MB is 100 parts by mass.

As the base resin, the softening agent, the silicone MB, the fatty acid-containing compound and the filler, the followings were used specifically.

(A) Base Resin (A-1) Polar Group-Free Polyolefin Resin (Polar Group-Free PO Resin)

(A-1-1) Block polypropylene copolymer (block PP) Manufactured by Prime Polymer Co., Ltd.

(A-1-2) Random polypropylene copolymer (random PP) Manufactured by Prime polymer Co., Ltd.

(A-1-3) Homopolypropylene copolymer (homo PP) Manufactured by Prime polymer Co., Ltd.

(A-1-4) Polyethylene (PE)

Linear low density polyethylene (LLDPE), manufactured by Sumitomo Chemical Company, Limited (A-1-5) Olefin-based elastomer An ethylene-α-olefin copolymer, manufactured by Mitsui Chemicals, Inc.

(A-2) Polar Group-Containing Polyolefin Resin (Polar Group-Containing PO Resin)

(A-2-1) Ethylene-ethyl acrylate copolymer (EEA) Manufactured by Japan Polyethylene Corporation (A-2-2) Ethylene-methyl acrylate copolymer (EMA) Manufactured by Arkema K. K.

(A-2-3) Maleic acid-modified polyolefin Manufactured by Mitsui Chemicals, Inc.

(A-2-4) Vinyl silane-grafted LDPE Manufactured by Mitsubishi Chemical Corporation (A-3) Polar Group-Free Non-PO Resin (A-3-1) Non-acid-modified styrene-based elastomer Hydrogenated styrene-butadiene rubber (HSBR), manufactured by JSR Corporation (A-4) Polar Group-Containing Non-PO Resin (A-4-1) Acid-modified styrene-based elastomer Maleic acid-modified styrene-ethylene-butylene-styrene copolymer, manufactured by ASAHI KASEI CORPORATION (B) Softening Agent Process oil (paraffin based process oil, manufactured by Idemitsu Kosan Co., Ltd.)

(C) Silicone MB (C-1) Silicone MB1

Manufactured by Shin-Etsu Chemical Co., Ltd.

(containing 50 mass % silicone gum (dimethylpolysiloxane) and 50 mass % polypropylene(PP))

(C-2) Silicone MB2

Manufactured by Shin-Etsu Chemical Co., Ltd.

(containing 50 mass % silicone gum (dimethylpolysiloxane) and 50 mass % polyethylene(PE))

(C-3) Silicone MB3

Containing 50 mass % silicone oil (dimethylpolysiloxane) and 50 mass % polypropylene (PP)

(D) Fatty Acid-Containing Compound (D-1) Magnesium stearate (Mg stearate): manufactured by ADEKA Corporation (D-2) Calcium stearate (Ca stearate): manufactured by Sakai Chemical Industry Co., Ltd.

(D-3) Stearic acid: manufactured by NOF CORPORATION (E) Filler
(E-1) Polar Group-Containing Silane Coupling Agent-Adhered Silicate Compound
(E-1-1) Aminosilane-adhered clay
Clay obtained by adding 3 parts by mass of aminosilane (3-aminopropyltrimethoxysilane, manufactured by Shin-Etsu Chemical Co., Ltd.) to 100 parts by mass of clay particles (Burgess & Pigment Co., calcined clay) and stirring it with a Henschel mixer
(E-1-2) Mercaptosilane-Adhered Clay
Clay obtained by adding 3 parts by mass of mercaptosilane (3-mercaptopropyltrimethoxysilane, manufactured by Shin-Etsu Chemical Co., Ltd.) to 100 parts by mass of clay particles (Burgess & Pigment Co., calcined clay) and stirring it with a Henschel mixer
(E-1-3) Methacrylsilane-adhered clay
Clay obtained by adding 3 parts by mass of methacrylsilane (3-methacryloxypropyltrimethoxysilane, manufactured by Shin-Etsu Chemical Co., Ltd.) to 100 parts by mass of clay particles (Burgess & Pigment Co., calcined clay) and stirring it with a Henschel mixer
(E-1-4) Aminosilane-adhered talc
Talc obtained by adding 3 parts by mass of aminosilane (3-aminopropyltrimethoxysilane, manufactured by Shin-Etsu Chemical Co., Ltd.) to 100 parts by mass of talc particles (manufactured by Nippon talc Co. Ltd.) and stirring it with a Henschel mixer
(E-1-5) Mercaptosilane-adhered talc
Talc obtained by adding 3 parts by mass of mercaptosilane (3-mercaptopropyltrimethoxysilane, manufactured by Shin-Etsu Chemical Co., Ltd.) to 100 parts by mass of talc particles (manufactured by Nippon talc Co. Ltd.) and stirring it with a Henschel mixer
(E-1-6) Methacrylic silane-adhered talc
Talc obtained by adding 3 parts by mass of methacrylsilane (3-methacryloxypropyltrimethoxysilane, manufactured by Shin-Etsu Chemical Co., Ltd.) to 100 parts by mass of talc particles (manufactured by Nippon talc Co. Ltd.) and stirring it with a Henschel mixer
(E-2) Polar Group-Free Silane Coupling Agent-Adhered Silicate Compound
(E-2-1) Vinylsilane-adhered clay
Clay obtained by adding 3 parts by mass of vinylsilane (vinyltrimethoxysilane, manufactured by Shin-Etsu chemical Co., Ltd.) relative to 100 parts by mass of clay particles (manufactured by Burgess & Pigment Co., calcined clay) and stirring it with a Henschel mixer
(E-2-2) Vinylsilane-adhered talc
Talc obtained by adding 3 parts by mass of vinylsilane (vinyltrimethoxysilane, manufactured by Shin-Etsu chemical Co., Ltd.) relative to 100 parts by mass of talc particles (manufactured by Nippon talc Co., Ltd.) and stirring it with a Henschel mixer
(E-3) Non-Silane Coupling Agent-Adhered Filler
(E-3-1) Fatty acid-adhered clay
Clay obtained by adding 3 parts by mass of a fatty acid (stearic acid, manufactured by NOF CORPORATION) relative to 100 parts by mass of clay particles (manufactured by Burgess & Pigment Co., calcined clay) and stirring it with a Henschel mixer
(E-3-2) Fatty acid-adhered talc
Talc obtained by adding 3 parts by mass of a fatty acid (stearic acid, manufactured by NOF CORPORATION) relative to 100 parts by mass of talc particles (manufactured by Nippon talc Co., Ltd.) and stirring it with a Henschel mixer (E-3-3) Fatty acid-adhered calcium carbonate particles Manufactured by Nitto Funka Kogyo K.K. (saturated fatty acid treatment)

[Characteristics Evaluation]

For the flame retardant resin compositions of Examples 1 to 42 and Comparative Examples o1 to 13 obtained as described above, evaluation of flame retardancy, plastic deformation suppressibility, lightweight property and wear resistance was performed.

Incidentally, the flame retardancy, the plastic deformation suppressibility and the wear resistance were evaluated for insulated wires manufactured in the following manner using the flame retardant resin compositions of Examples 1 to 42 and Comparative Examples 1 to 13.

(Preparation of Insulated Wire)

Flame retardant resin compositions of Examples 1 to 42 and Comparative Examples 1 to 13 were charged into a single-screw extruder (L/D=20, screw shape: full flight screw, manufactured by Marth Seiki Co., Ltd) and kneaded. Then, a tubular extrudate was extruded from the extruder and was coated on a conductor having a cross-sectional area of 0.382 $mm^2$ to have a thickness of 0.3 mm. Thus, an insulated wire was prepared.

<Flame Retardancy>

Flame retardancy was evaluated based on a result obtained by performing a 45° inclined combustion test according to ISO 6722 for ten insulated wires obtained as described above. At this time, 45° inclined combustion test was specifically performed as follows. First, a portion having a length of 600 mm was cut out as a sample from the insulated wire, and this sample was fixed in a state inclined at an angle of 45° to the horizontal plane. Next, flame of a burner having a predetermined size was contacted for 15 seconds beneath the sample. However, when the conductor was exposed in the middle of flame contact, flame contact was terminated by separating the burner flame from the sample at that time. Then, the time until the sample self-extinguishes after termination of the flame contact was measured. Acceptance criteria of the sample were as follows. The results are shown in Tables 1 to 7. Incidentally, in Tables 1 to 7, samples which reached the acceptance criteria in terms of the flame retardancy was denoted as "○" and samples which did not reached the acceptance criteria was denoted as "×".

(Acceptance Criteria) Ten all samples self-extinguish within 70 seconds after termination of flame contact, and the upper part of the sample remains with it not burned over the length of 50 mm or more Incidentally, in a case where even one of the ten samples did not self-extinguish within 70 seconds from termination of flame contact or in a case where even in one of the ten samples the upper part of the sample did not remain over the length of 50 mm or more, the samples were judged to be unacceptable.

<Plastic Deformation Suppressibility (Terminal Workability)>

For ten insulated wires obtained as described above, terminal strips were performed with a strip length set to 4 mm. Then, by observing the insulated wire end portion after the terminal strip with a microscope, a whisker length was measured. The whisker length was used as an index of the plastic deformation suppressibility (terminal workability).

The results are shown in Tables 1 to 7. Acceptance criteria of plastic deformation suppressibility were as follows.
(Acceptance Criteria) the length of whiskers is 0.60 mm or less
<Lightweight Property>

For lightweight property, a specific gravity of the insulating layer of the insulated wire prepared as described above was used as an index. At this time, the specific gravity of the insulating layer was measured as follows. That is, the insulating layer was stripped from the insulated wire and melt-kneaded to prepare a uniform sheet having a thickness of 2 mm. Then, the specific gravity of the insulating layer was measured with an electronic densimeter (manufactured by Alfa Mirage Co., Ltd.) based on the Archimedes method. The results are shown in Tables 1 to 7.
<Wear Resistance>

For the insulated wires obtained as described above, a scrape test was performed according to JASO D618, and number of scrapes was measured. The results are shown in Tables 1 to 7.

TABLE 1

|  |  |  |  | Example 1 | Example 2 | Example 3 | Example 4 | Example 5 |
|---|---|---|---|---|---|---|---|---|
| Composition | Base resin | Polar group-free PO resin | Block PP | 65 | 65 | 65 | 65 | 65 |
|  |  |  | Randam PP |  |  |  |  |  |
|  |  |  | Homo PP |  |  |  |  |  |
|  |  |  | PE | 30 | 30 | 30 | 30 | 30 |
|  |  |  | Olefin-based elastomer |  |  |  |  |  |
|  |  | Polar group-containing PO resin | EEA |  |  |  |  |  |
|  |  |  | EMA |  |  |  |  |  |
|  |  |  | Maleic acid-modified polyolefin |  |  |  |  |  |
|  |  | Polar group-containing non-PO resin | Acid-modified styrene-based elastmoer |  |  |  |  |  |
|  |  | Polar group-free non-PO resin | Non-acid-modified styrene-based elastmoer |  |  |  |  |  |
|  | Softening agent | Process oil |  |  |  |  |  |  |
|  | Silicone MB | Silicone MB1 | PP/Silicone gum | 5/5 | 5/5 | 5/5 | 5/5 | 5/5 |
|  |  | Silicone MB2 | PE/Silicone gum |  |  |  |  |  |
|  | Fatty acid-containing compound | Mg stearate |  | 7 | 7 | 7 | 7 | 7 |
|  | Filler | Polar group-containing silane coupling agent-adhered silicate compound | Aminosilane-adhered clay | 60 |  |  |  |  |
|  |  |  | Mercaptosilane-adhered clay |  | 60 |  |  |  |
|  |  |  | Methacrylsilane-adhered clay |  |  | 60 |  |  |
|  |  |  | Aminosilane-adhered talc |  |  |  | 60 |  |
|  |  |  | Mercaptosilane-adhered talc |  |  |  |  | 60 |
|  |  |  | Methacrylsilane-adhered talc |  |  |  |  |  |
| Characteristics Evaluation | Flame Retardancy | 45° inclined combustion test |  | ○ | ○ | ○ | ○ | ○ |
|  | Plastic Deformation Suppressibility (Terminal Workability) | Whisker length (mm) |  | 0.12 | 0.25 | 0.44 | 0.16 | 0.26 |
|  | Lightweight Property | Specific gravity |  | 1.7 | 1.17 | 1.17 | 1.17 | 1.17 |
|  | Wear Resistance | Number of scrapes (times) |  | 356 | 331 | 269 | 238 | 219 |

|  |  |  |  | Example 6 | Example 7 | Example 8 | Example 9 | Example 10 |
|---|---|---|---|---|---|---|---|---|
| Composition | Base resin | Polar group-free PO resin | Block PP | 65 | 65 | 65 | 65 | 65 |
|  |  |  | Randam PP |  |  |  |  |  |
|  |  |  | Homo PP |  |  |  |  |  |
|  |  |  | PE | 30 | 30 | 30 | 30 | 30 |
|  |  |  | Olefin-based elastomer |  |  |  |  |  |
|  |  | Polar group-containing PO resin | EEA |  |  |  |  |  |
|  |  |  | EMA |  |  |  |  |  |
|  |  |  | Maleic acid-modified polyolefin |  |  |  |  |  |
|  |  | Polar group-containing non-PO resin | Acid-modified styrene-based elastmoer |  |  |  |  |  |
|  |  | Polar group-free non-PO resin | Non-acid-modified styrene-based elastmoer |  |  |  |  |  |

TABLE 1-continued

|  |  |  |  |  |  |  |  |
|---|---|---|---|---|---|---|---|
|  | Softening agent | Process oil |  |  |  |  |  |  |
|  | Silicone MB | Silicone MB1 | PP/Silicone gum | 5/5 | 5/5 | 5/5 | 5/5 | 5/5 |
|  |  | Silicone MB2 | PE/Silicone gum |  |  |  |  |  |
|  | Fatty acid-containing compound | Mg stearate |  | 7 | 7 | 7 | 3 | 20 |
|  | Filler | Polar group-containing silane coupling agent-adhered silicate compound | Aminosilane-adhered clay |  | 5 | 145 | 60 | 60 |
|  |  |  | Mercaptosilane-adhered clay |  |  |  |  |  |
|  |  |  | Methacrylsilane-adhered clay |  |  |  |  |  |
|  |  |  | Aminosilane-adhered talc |  |  |  |  |  |
|  |  |  | Mercaptosilane-adhered talc |  |  |  |  |  |
|  |  |  | Methacrylsilane-adhered talc | 60 |  |  |  |  |
| Characteristics Evaluation | Flame Retardancy | 45° inclined combustion test |  | ◯ | ◯ | ◯ | ◯ | ◯ |
|  | Plastic Deformation Suppressibility (Terminal Workability) | Whisker length (mm) |  | 0.46 | 0.17 | 0.09 | 0.11 | 0.15 |
|  | Lightweight Property | Specific gravity |  | 1.17 | 0.94 | 1.43 | 1.17 | 1.17 |
|  | Wear Resistance | Number of scrapes (times) |  | 178 | 505 | 128 | 432 | 105 |

TABLE 2

|  |  |  |  | Example 11 | Example 12 | Example 13 | Example 14 | Example 15 |
|---|---|---|---|---|---|---|---|---|
| Composition | Base resin | Polar group-free PO resin | Block PP | 69.5 | 60 | 65 | 65 | 65 |
|  |  |  | Randam PP |  |  |  |  |  |
|  |  |  | Homo PP |  |  |  |  |  |
|  |  |  | PE | 30 | 30 | 30 | 30 | 30 |
|  |  |  | Olefin-based elastomer |  |  |  |  |  |
|  |  | Polar group-containing PO resin | EEA |  |  |  |  |  |
|  |  |  | EMA |  |  |  |  |  |
|  |  |  | Maleic acid-modified polyolefin |  |  |  |  |  |
|  |  | Polar group-containing non-PO resin | Acid-modified styrene-based elastmoer |  |  |  |  |  |
|  |  | Polar group-free non-PO resin | Non-acid-modified styrene-based elastmoer |  |  |  |  |  |
|  | Softening agent | Process oil |  |  |  |  |  |  |
|  | Silicone MB | Silicone MB1 | PP/Silicone gum | 0.5/0.5 | 10/10 | 5/5 | 5/5 | 5/5 |
|  |  | Silicone MB2 | PE/Silicone gum |  |  |  |  |  |
|  | Fatty acid-containing compound | Mg stearate |  | 7 | 7 | 7 | 7 | 7 |
|  | Filler | Polar group-containing silane coupling agent-adhered silicate compound | Aminosilane-adhered clay | 60 | 60 |  |  |  |
|  |  |  | Mercaptosilane-adhered clay |  |  | 5 | 145 |  |
|  |  |  | Methacrylsilane-adhered clay |  |  |  |  | 5 |
|  |  |  | Aminosilane-adhered talc |  |  |  |  |  |
|  |  |  | Mercaptosilane-adhered talc |  |  |  |  |  |
|  |  |  | Methacrylsilane-adhered talc |  |  |  |  |  |
| Characteristics Evaluation | Flame Retardancy | 45° inclined combustion test |  | ◯ | ◯ | ◯ | ◯ | ◯ |
|  | Plastic Deformation Suppressibility (Terminal Workability) | Whisker length (mm) |  | 0.10 | 0.25 | 0.35 | 0.21 | 0.57 |
|  | Lightweight Property | Specific gravity |  | 1.17 | 1.17 | 0.94 | 1.43 | 0.94 |
|  | Wear Resistance | Number of scrapes (times) |  | 302 | 107 | 499 | 122 | 489 |

TABLE 2-continued

|  |  |  |  | Example 16 | Example 17 | Example 18 | Example 19 |
|---|---|---|---|---|---|---|---|
| Composition | Base resin | Polar group-free PO resin | Block PP | 65 | 65 | 65 | 65 |
|  |  |  | Randam PP |  |  |  |  |
|  |  |  | Homo PP |  |  |  |  |
|  |  |  | PE | 30 | 30 | 30 | 30 |
|  |  |  | Olefin-based elastomer |  |  |  |  |
|  |  | Polar group-containing PO resin | EEA |  |  |  |  |
|  |  |  | EMA |  |  |  |  |
|  |  |  | Maleic acid-modified polyolefin |  |  |  |  |
|  |  | Polar group-containing non-PO resin | Acid-modified styrene-based elastmoer |  |  |  |  |
|  |  | Polar group-free non-PO resin | Non-acid-modified styrene-based elastmoer |  |  |  |  |
|  | Softening agent | Process oil |  |  |  |  |  |
|  | Silicone MB | Silicone MB1 | PP/Silicone gum | 5/5 | 5/5 | 5/5 | 5/5 |
|  |  | Silicone MB2 | PE/Silicone gum |  |  |  |  |
|  | Fatty acid-containing compound | Mg stearate |  | 7 | 7 | 7 | 7 |
|  | Filler | Polar group-containing silane coupling agent-adhered silicate compound | Aminosilane-adhered clay |  |  |  |  |
|  |  |  | Mercaptosilane-adhered clay |  |  |  |  |
|  |  |  | Methacrylsilane-adhered clay | 145 |  |  |  |
|  |  |  | Aminosilane-adhered talc |  | 5 | 145 |  |
|  |  |  | Mercaptosilane-adhered talc |  |  |  | 5 |
|  |  |  | Methacrylsilane-adhered talc |  |  |  |  |
| Characteristics Evaluation | Flame Retardancy | 45° inclined combustion test |  | ○ | ○ | ○ | ○ |
|  | Plastic Deformation Suppressibility (Terminal Workability) | Whisker length (mm) |  | 0.41 | 0.19 | 0.13 | 0.45 |
|  | Lightweight Property | Specific gravity |  | 1.43 | 0.94 | 1.44 | 0.94 |
|  | Wear Resistance | Number of scrapes (times) |  | 109 | 478 | 133 | 476 |

TABLE 3

|  |  |  |  | Example 20 | Example 21 | Example 22 | Example 23 | Example 24 |
|---|---|---|---|---|---|---|---|---|
| Composition | Base resin | Polar group-free PO resin | Block PP | 65 | 85 | 65 | 65 | 45 |
|  |  |  | Randam PP |  |  |  |  |  |
|  |  |  | Homo PP |  |  |  |  |  |
|  |  |  | PE | 30 | 30 | 30 | 20 | 50 |
|  |  |  | Olefin-based elastomer |  |  |  |  |  |
|  |  | Polar group-containing PO resin | EEA |  |  |  |  |  |
|  |  |  | EMA |  |  |  |  |  |
|  |  |  | Maleic acid-modified polyolefin |  |  |  | 10 |  |
|  |  | Polar group-containing non-PO resin | Acid-modified styrene-based elastmoer |  |  |  |  |  |
|  |  | Polar group-free non-PO resin | Non-acid-modified styrene-based elastmoer |  |  |  |  |  |
|  | Softening agent | Process oil |  |  |  |  |  |  |
|  | Silicone MB | Silicone MB1 | PP/Silicone gum | 5/5 | 5/5 | 5/5 | 5/5 | 5/5 |
|  |  | Silicone MB2 | PE/Silicone gum |  |  |  |  |  |
|  | Fatty acid-containing compound | Mg stearate |  | 7 | 7 | 7 | 7 | 7 |

TABLE 3-continued

| | | | | | | | | |
|---|---|---|---|---|---|---|---|---|
| | Filler | Polar group-containing silane coupling agent-adhered silicate compound | Aminosilane-adhered clay | | | | 60 | 80 |
| | | | Mercaptosilane-adhered clay | | | | | |
| | | | Methacrylsilane-adhered clay | | | | | |
| | | | Aminosilane-adhered talc | | | | | |
| | | | Mercaptosilane-adhered talc | 145 | | | | |
| | | | Methacrylsilane-adhered talc | | 5 | 145 | | |
| Characteristics Evaluation | Flame Retardancy | 45° inclined combustion test | | ○ | ○ | ○ | ○ | ○ |
| | Plastic Deformation Suppressibility (Terminal Workability) | Whisker length (mm) | | 0.23 | 0.59 | 0.42 | 0.05 | 0.16 |
| | Lightweight Property | Specific gravity | | 1.44 | 0.94 | 1.44 | 1.17 | 1.17 |
| | Wear Resistance | Number of scrapes (times) | | 125 | 475 | 107 | 388 | 221 |

| | | | | Example 25 | Example 26 | Example 27 | Example 28 |
|---|---|---|---|---|---|---|---|
| Composition | Base resin | Polar group-free PO resin | Block PP | 85 | | | 65 |
| | | | Randam PP | | 65 | | |
| | | | Homo PP | | | 65 | |
| | | | PE | 10 | 30 | 30 | |
| | | | Olefin-based elastomer | | | | |
| | | Polar group-containing PO resin | EEA | | | | |
| | | | EMA | | | | |
| | | | Maleic acid-modified polyolefin | | | | |
| | | Polar group-containing non-PO resin | Acid-modified styrene-based elastmoer | | | | |
| | | Polar group-free non-PO resin | Non-acid-modified styrene-based elastmoer | | | | 30 |
| | Softening agent | Process oil | | | | | |
| | Silicone MB | Silicone MB1 | PP/Silicone gum | 5/5 | 5/5 | 5/5 | 5/5 |
| | | Silicone MB2 | PE/Silicone gum | | | | |
| | Fatty acid-containing compound | Mg stearate | | 7 | 7 | 7 | 7 |
| | Filler | Polar group-containing silane coupling agent-adhered silicate compound | Aminosilane-adhered clay | 60 | 60 | 60 | 60 |
| | | | Mercaptosilane-adhered clay | | | | |
| | | | Methacrylsilane-adhered clay | | | | |
| | | | Aminosilane-adhered talc | | | | |
| | | | Mercaptosilane-adhered talc | | | | |
| | | | Methacrylsilane-adhered talc | | | | |
| Characteristics Evaluation | Flame Retardancy | 45° inclined combustion test | | ○ | ○ | ○ | ○ |
| | Plastic Deformation Suppressibility (Terminal Workability) | Whisker length (mm) | | 0.11 | 0.14 | 0.11 | 0.15 |
| | Lightweight Property | Specific gravity | | 1.17 | 1.17 | 1.17 | 1.17 |
| | Wear Resistance | Number of scrapes (times) | | 1230 | 320 | 452 | 254 |

TABLE 4

| | | | | Example 29 | Example 30 | Example 31 | Example 32 | Example 33 |
|---|---|---|---|---|---|---|---|---|
| Composition | Base resin | Polar group-free PO resin | Block PP | 65 | 65 | 65 | 65 | 50 |
| | | | Randam PP | | | | | |
| | | | Homo PP | | | | | |
| | | | PE | | | | | |

TABLE 4-continued

| | | | | | | | |
|---|---|---|---|---|---|---|---|
| | | | Olefin-based elastomer | | | | | 45 |
| | | Polar group-containing PO resin | EEA | | 30 | | | |
| | | | EMA | | | 30 | | |
| | | | Maleic acid-modified polyolefin | | | | | |
| | | | Vinyl silane-grafted LDPE | | | | 30 | |
| | | Polar group-containing non-PO resin | Acid-modified styrene-based elastmoer | 10 | | | | |
| | | Polar group-free non-PO resin | Non-acid-modified styrene-based elastmoer | 20 | | | | |
| | Softening agent | Process oil | | | | | | |
| | Silicone MB | Silicone MB1 | PP/Silicone gum | | | | | |
| | | Silicone MB2 | PE/Silicone gum | 5/5 | 5/5 | 5/5 | 5/5 | 5/5 |
| | Fatty acid-containing compound | Mg stearate | | | | | | |
| | Filler | Polar group-containing silane coupling agent-adhered silicate compound | Aminosilane-adhered clay | 7 | 7 | 7 | 7 | 7 |
| | | | Mercaptosilane-adhered clay | 60 | 60 | 60 | 60 | 60 |
| | | | Methacrylsilane-adhered clay | | | | | |
| | | | Aminosilane-adhered talc | | | | | |
| | | | Mercaptosilane-adhered talc | | | | | |
| | | | Methacrylsilane-adhered talc | | | | | |
| Characteristics Evaluation | Flame Retardancy | 45° inclined combustion test | | ○ | ○ | ○ | ○ | ○ |
| | Plastic Deformation Suppressibility (Terminal Workability) | Whisker length (mm) | | 0.07 | 0.09 | 0.09 | 0.09 | 0.16 |
| | Lightweight Property | Specific gravity | | 1.17 | 1.17 | 1.17 | 1.17 | 1.17 |
| | Wear Resistance | Number of scrapes (times) | | 289 | 302 | 298 | 312 | 124 |

| | | | | Example 34 | Example 35 | Example 36 | Example 37 | Example 33 |
|---|---|---|---|---|---|---|---|---|
| Composition | Base resin | Polar group-free PO resin | Block PP | 25 | 25 | 65 | 65 | 65 |
| | | | Randam PP | | | | | |
| | | | Homo PP | | | | | |
| | | | PE | 25 | 25 | 30 | 30 | 30 |
| | | | Olefin-based elastomer | 20 | 20 | | | |
| | | Polar group-containing PO resin | EEA | | | | | |
| | | | EMA | | | | | |
| | | | Maleic acid-modified polyolefin | | | | | |
| | | | Vinyl silane-grafted LDPE | | | | | |
| | | Polar group-containing non-PO resin | Acid-modified styrene-based elastmoer | | | | | |
| | | Polar group-free non-PO resin | Non-acid-modified styrene-based elastmoer | 25 | 25 | | | |
| | Softening agent | Process oil | | | | | 10 | |
| | Silicone MB | Silicone MB1 | PP/Silicone gum | 5/5 | 5/5 | 5/5 | 11/11 | 5/5 |
| | | Silicone MB2 | PE/Silicone gum | | | | | |
| | Fatty acid-containing compound | Mg stearate | | 7 | 7 | 7 | 7 | 21 |
| | Filler | Polar group-containing silane coupling agent-adhered silicate compound | Aminosilane-adhered clay | 60 | 60 | 150 | 60 | 60 |
| | | | Mercaptosilane-adhered clay | | | | | |
| | | | Methacrylsilane-adhered clay | | | | | |
| | | | Aminosilane-adhered talc | | | | | |
| | | | Mercaptosilane-adhered talc | | | | | |

TABLE 4-continued

| Characteristics Evaluation | Flame Retardancy | Methacrylsilane-adhered talc 45° inclined combustion test | ○ | ○ | ○ | ○ | ○ |
|---|---|---|---|---|---|---|---|
| | Plastic Deformation Suppressibility (Terminal Workability) | Whisker length (mm) | 0.18 | 0.19 | 0.09 | 0.10 | 0.10 |
| | Lightweight Property | Specific gravity | 1.17 | 1.17 | 1.45 | 1.17 | 1.17 |
| | Wear Resistance | Number of scrapes (times) | 40 | 5 | — | 83 | 92 |

TABLE 5

| | | | | Example 39 | Example 40 | Example 41 | Example 42 |
|---|---|---|---|---|---|---|---|
| Composition | Base resin | Polar group-free PO resin | Block PP | 70 | 65 | 65 | 65 |
| | | | Randam PP | | | | |
| | | | Homo PP | | | | |
| | | | PE | 25 | 30 | 30 | 30 |
| | | Polar group-containing PO resin | EEA | | | | |
| | | | EMA | | | | |
| | | | Maleic acid-modified polyolefin | | | | |
| | | Polar group-containing non-PO resin | Acid-modified styrene-based elastmoer | | | | |
| | | Polar group-free non-PO resin | Non-acid-modified styrene-based elastmoer | | | | |
| | Softening agent | Process oil | | | | | |
| | Silicone MB | Silicone MB1 | PP/Silicone gum | | | 5/5 | 5/5 |
| | | Silicone MB2 | PE/Silicone gum | 5/5 | | | |
| | | Silicone MB3 | PP/Silicone oil | | 5/5 | | |
| | Fatty acid-containing compound | Mg stearate | | 7 | 7 | | |
| | | Ca stearate | | | | 7 | |
| | | Stearic acid | | | | | 7 |
| | Filler | Polar group-containing silane coupling agent-adhered silicate compound | Aminosilane-adhered clay | 60 | 60 | 60 | 60 |
| Characteristics Evaluation | Flame Retardancy | | 45° inclined combustion test | ○ | ○ | ○ | ○ |
| | Plastic Deformation Suppressibility (Terminal Workability) | | Whisker length (mm) | 0.12 | 0.13 | 0.12 | 0.15 |
| | Lightweight Property | | Specific gravity | 1.17 | 1.17 | 1.17 | 1.17 |
| | Wear Resistance | | Number of scrapes (times) | 353 | 343 | 344 | 321 |

TABLE 6

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| Composition | Base resin | Polar group-free resin | Block PP | 65 | 65 | 65 | 65 | 65 | 65 |
| | | | Randam PP | | | | | | |
| | | | Homo PP | | | | | | |
| | | | PE | 30 | 30 | 30 | 30 | 30 | 30 |
| | | | Olefin-based elastomer | | | | | | |
| | | Polar group-containing PO resin | EEA | | | | | | |
| | | | EMA | | | | | | |
| | | | Maleic acid-modified polyolefin | | | | | | |
| | | Polar group-containing non-PO resin | Acid-modified styrene-based elastmoer | | | | | | |
| | | Polar group-free non-PO resin | Non-acid-modified styrene-based elastmoer | | | | | | |

TABLE 6-continued

|  |  |  | Comparative Example 1 | Comparative Example 2 | Comparative Example 3 | Comparative Example 4 | Comparative Example 5 | Comparative Example 6 |
| --- | --- | --- | --- | --- | --- | --- | --- | --- |
|  | Silicone MB | Silicone MB1 PP/Silicone gum | 5/5 | 5/5 | 5/5 | 5/5 | 5/5 | 5/5 |
|  |  | Silicone MB2 PE/Silicone gum |  |  |  |  |  |  |
|  | Fatty acid-containing compound | Mg stearate | 7 | 7 | 7 | 7 | 7 | 7 |
|  | Filler | Polar group-free silane coupling agent-adhered silicate compound | Vinylsilane-adhered clay | 60 | 150 |  |  |  |  |
|  |  |  | Vinylsilane-adhered talc |  |  |  |  | 60 | 150 |
|  |  | Non-silane coupling agent-adhered filler | Fatty acid-adhered clay |  |  | 60 | 150 |  |  |
|  |  |  | Fatty acid-adhered talc |  |  |  |  |  |  |
|  |  |  | Fatty acid-adhered calcium carbonate particles |  |  |  |  |  |  |
| Characteristics Evaluation | Flame Retardancy | 45° inclined combustion test | ○ | ○ | ○ | ○ | ○ | ○ |
|  | Plastic Deformation Suppressibility (Terminal Workability) | Whisker length (mm) | 1.50 | 0.91 | 1.76 | 0.99 | 1.66 | 0.92 |
|  | Lightweight Property | Specific gravity | 1.17 | 1.45 | 1.17 | 1.45 | 1.17 | 1.46 |
|  | Wear Resistance | Number of scrapes (times) | — | — | — | — | — | — |

TABLE 7

|  |  |  |  | Comparative Example 7 | Comparative Example 8 | Comparative Example 9 | Comparative Example 10 |
| --- | --- | --- | --- | --- | --- | --- | --- |
| Composition | Base resin | Polar group-free PO resin | Block PP | 85 | 65 | 65 | 65 |
|  |  |  | Randam PP |  |  |  |  |
|  |  |  | Homo PP |  |  |  |  |
|  |  |  | PE | 30 | 30 | 30 | 30 |
|  |  |  | Olefin-based elastomer |  |  |  |  |
|  |  | Polar group-containing PO resin | EEA |  |  |  |  |
|  |  |  | EMA |  |  |  |  |
|  |  |  | Maleic acid-modified polyolefin |  |  |  |  |
|  |  | Polar group-containing non-PO resin | Acid-modified styrene-based elastmoer |  |  |  |  |
|  |  | Polar group-free non-PO resin | Non-acid-modified styrene-based elastmoer |  |  |  |  |
|  | Silicone MB | Silicone MB1 | PP/Silicone gum | 5/5 | 5/5 | 5/5 | 5/5 |
|  |  | Silicone MB2 | PE/Silicone gum |  |  |  |  |
|  | Fatty acid-containing compound | Mg stearate |  | 7 | 7 | 7 | 7 |
|  | Filler | Polar group-containing silane coupling agent-adhered silicate compound | Aminosilane-adhered clay |  |  |  |  |
|  |  | Non-silane coupling agent-adhered filler | Fatty acid-adhered talc | 60 | 150 |  |  |
|  |  |  | Fatty acid-adhered calcium carbonate particles |  |  | 60 | 150 |
| Characteristics Evaluation | Flame Retardancy | 45° inclined combustion test |  | ○ | ○ | ○ | ○ |
|  | Plastic Deformation Suppressibility (Terminal Workability) | Whisker length (mm) |  | 1.82 | 1.09 | 2.10 | 1.13 |
|  | Lightweight Property | Specific gravity |  | 1.17 | 1.46 | 1.17 | 1.46 |
|  | Wear Resistance | Number of scrapes (times) |  | — | — | — | — |

TABLE 7-continued

|  |  |  |  | Comparative Example 11 | Comparative Example 12 | Comparative Example 13 |
|---|---|---|---|---|---|---|
| Composition | Base resin | Polar group-free PO resin | Block PP | 65 | 65 | 65 |
|  |  |  | Randam PP |  |  |  |
|  |  |  | Homo PP |  |  |  |
|  |  |  | PE | 30 | 30 | 30 |
|  |  |  | Olefin-based elastomer |  |  |  |
|  |  | Polar group-containing PO resin | EEA |  |  |  |
|  |  |  | EMA |  |  |  |
|  |  |  | Maleic acid-modified polyolefin |  |  |  |
|  |  | Polar group-containing non-PO resin | Acid-modified styrene-based elastmoer |  |  |  |
|  |  | Polar group-free non-PO resin | Non-acid-modified styrene-based elastmoer |  |  |  |
|  | Silicone MB | Silicone MB1 | PP/Silicone gum | 5/5 | 0.4/0.4 | 5/5 |
|  |  | Silicone MB2 | PE/Silicone gum |  |  |  |
|  | Fatty acid-containing compound | Mg stearate |  | 7 | 7 | 2 |
|  | Filler | Polar group-containing silane coupling agent-adhered silicate compound | Aminosilane-adhered clay | 3 | 60 | 60 |
|  |  | Non-silane coupling agent-adhered filler | Fatty acid-adhered talc |  |  |  |
|  |  |  | Fatty acid-adhered calcium carbonate particles |  |  |  |
| Characteristics Evaluation | Flame Retardancy |  | 45° inclined combustion test | o | x | x |
|  | Plastic Deformation Suppressibility (Terminal Workability) |  | Whisker length (mm) | 0.71 | 0.10 | 0.10 |
|  | Lightweight Property |  | Specific gravity | 0.93 | 1.17 | 1.17 |
|  | Wear Resistance |  | Number of scrapes (times) | — | — | — |

From the results shown in Tables 1 to 7, the flame retardant resin compositions of Examples 1 to 42 reached acceptance criteria in terms of flame retardancy and plastic deformation suppressibility. In contrast, the flame retardant resin compositions of Comparative Examples 1 to 13 did not reach at least one acceptance criteria of flame retardancy and plastic deformation suppressibility.

From this, it was confirmed that the flame retardant resin composition of one or more embodiments of the present invention can suppress the plastic deformation while having a good flame retardancy.

Since the flame retardant resin composition of one or more embodiments of the present invention can suppress plastic deformation while having a good flame retardancy, an insulated wire, a cable and an optical fiber cable of one or more embodiments of the present invention are particularly suitable for insulated wires, cables and optical fiber cables in automobile.

DESCRIPTION OF REFERENCE NUMERALS

1 . . . Conductor
2 . . . Insulating layer
3 . . . Coating layer
4 . . . Insulated wire
10 . . . Cable
20 . . . Optical fiber cable
24 . . . Optical fiber
25 . . . Covering portion Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A flame retardant resin composition, comprising:
a base resin;
a filler blended in a ratio of 5 parts by mass or more and less than 150 parts by mass relative to 100 parts by mass of the base resin;
a silicone compound blended in a ratio of 0.5 part by mass or more relative to 100 parts by mass of the base resin; and
a fatty acid-containing compound blended in a ratio of 3 parts by mass or more relative to 100 parts by mass of the base resin;
wherein the filler has a silane coupling agent having a polar group adhered to at least a part of a surface of a silicate compound, the silicate compound consisting of talc,
wherein the base resin includes a polar group-free polyolefin resin containing no polar group, the polar group-free polyolefin resin containing polypropylene and polyethylene,
wherein a content of the polypropylene in the polar group-free polyolefin resin is from 50 to 71.7 parts by mass and a content of polyethylene in the polar group-free polyolefin resin is from 28.3 to 50 parts by mass, relative to 100 parts by mass of the polar group-free polyolefin resin, wherein the fatty acid-containing compound is a fatty acid metal salt, and wherein a blending ratio of the silane coupling agent relative to 100 parts by mass of the silicate compound is 0.1 to 5 parts by mass in the filler.

2. The flame retardant resin composition according to claim 1, wherein the polar group includes at least one selected from the group consisting of a nitrogen atom, a sulfur atom, and an oxygen atom.

3. The flame retardant resin composition according to claim 1, wherein the polar group includes at least one selected from the group consisting of a nitrogen atom and a sulfur atom.

4. The flame retardant resin composition according to claim 1, wherein the polar group includes an amino group.

5. The flame retardant resin composition according to claim 1, wherein the polar group includes a mercapto group.

6. The flame retardant resin composition according to claim 1, wherein the base resin includes a polar group-containing resin containing a polar group.

7. The flame retardant resin composition according to claim 6, wherein the polar group-containing resin is composed of a polar group-containing polyolefin resin containing a polar group.

8. An insulated wire, comprising:
a conductor; and
an insulating layer covering the conductor,
wherein the insulating layer is composed of the flame retardant resin composition according to claim 1.

9. A cable, comprising:
an insulated wire including a conductor and an insulating layer covering the conductor; and
a sheath covering the insulated wire,
wherein at least one of the insulating layer and the sheath is composed of the flame retardant resin composition according to claim 1.

10. An optical fiber cable, comprising:
an optical fiber; and
a covering portion covering the optical fiber,
wherein at least a part of the covering portion is composed of the flame retardant resin composition according to claim 1.

* * * * *